United States Patent
Atri et al.

(10) Patent No.: US 7,181,672 B2
(45) Date of Patent: Feb. 20, 2007

(54) METHOD, SYSTEM, AND APPARATUS FOR SUPPORTING POWER LOSS RECOVERY IN ECC ENABLED MEMORY DEVICES

(75) Inventors: Sunil R. Atri, Folsom, CA (US); John C. Rudelic, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 534 days.

(21) Appl. No.: 10/672,998

(22) Filed: Sep. 25, 2003

(65) Prior Publication Data

US 2005/0071731 A1   Mar. 31, 2005

(51) Int. Cl.
*G11C 29/00* (2006.01)

(52) U.S. Cl. .................................................. 714/763
(58) Field of Classification Search ............... 714/763
See application file for complete search history.

(56) References Cited

U.S. PATENT DOCUMENTS

| 5,544,312 A * | 8/1996 | Hasbun et al. ............ 714/42 |
| 6,839,823 B1 * | 1/2005 | See et al. .................. 711/171 |
| 6,970,969 B2 * | 11/2005 | Wong et al. ............... 711/103 |

* cited by examiner

*Primary Examiner*—Shelly Chase
(74) *Attorney, Agent, or Firm*—Michael J. Nesheiwat

(57) ABSTRACT

A technique for coalesced Power Loss Recovery PLR status bits in an Error Correction Code ECC enabled flash memory.

20 Claims, 6 Drawing Sheets

ECC Operation

| 64bit ECC write buf | ECC |

ECC calculated base on the Single byte and all FFs

| Write a single byte | ECC |

ECC disabled by 2nd write

| Write a 2nd byte | ~~ECC~~ |

With ECC disabled all data in the range is at risk

FIG. 2
(PRIOR ART)

METHOD, SYSTEM, AND APPARATUS FOR SUPPORTING POWER LOSS RECOVERY IN ECC ENABLED MEMORY DEVICES

BACKGROUND OF THE INVENTION

1. Field of the Invention

The present invention relates generally to supporting Error Correcting Code (ECC) enabled memory devices, specifically, a novel mechanism for a Power Loss Recovery (PLR) algorithm and flash media format for flash media management software.

2. Description of the Related Art

The demand for quicker and more powerful communication devices has led to many technological advances, including flash memory and the ability to store and retain data despite the loss of power. A non-volatile memory has the ability to retain the data despite loss of power and is one of the enabling technologies for the wireless and cellular revolution.

A flash media is a system with various configurations of flash memory devices to create a non-volatile storage. One example is a system with a 32 bit bus and multiple 8 bit flash memory devices coupled to the 32 bit bus. Also, flash media could be hardware with additional decoding logic to manage and coordinate the various arrays of flash memory devices. Thus, the flash media exhibits the same flash memory device read, program, and erase characteristics. A flash media could be coupled to a file system, which has the interface and logic to manage files and directories. Thus, the interface with the file system allows for the ability to create, delete, move, read, write, and flush files and create, get, delete, read, flush, and write directories.

Typically, a flash media management software divides a flash memory block into individual data units or sectors, wherein each sector has an associated header for identifying a sector's status. Likewise, status bits or paired bits in Multi-Level Cell (MLC) flash are utilized for tracking the current state of each sector. However, as depicted in FIG. 1, the prior art flash media format interleaves the PLR status tracking information with the data units. However, an ECC enabled flash memory device might have an entire block of data unprotected by the ECC. Typically, ECC is similar to parity because additional bits of information are added to data for detecting and correcting individual bit errors. For example, a single bit error may result in a complete inverse of the ECC parity. Typically, the data may be changed to correct the single bit error. However, for an ECC enabled flash memory device that stores the ECC information, one needs to invalidate the ECC because of the single bit error. Based on FIG. 2, this may result in data that is unprotected because of the interleaving of PLR status bits with the data.

BRIEF DESCRIPTION OF THE SEVERAL VIEWS OF THE DRAWINGS

The present invention is illustrated by way of example and not limitation in the following figures. Like references indicate similar elements, in which:

FIGS. 1 and 2 depict the prior art.

DETAILED DESCRIPTION OF THE INVENTION

A method, system and apparatus for supporting ECC enabled memory devices in flash media systems is discussed. In the following description, for purposes of explanation, numerous details are set forth in order to provide a thorough understanding of the present invention. However, it will be apparent to one skilled in the art that these specific details are not required in order to practice the present invention.

As previously described, a problem exists for current flash media formats that interleave PLR status bits with data and may result in data that is unprotected because of the interleaving of PLR status bits with the data. In contrast, the claimed subject matter proposes a novel technique for rearranging the PLR status bits such that all the status bits are extracted from the header and data area and united (coalesced) into a predetermined region. Thus, this rearranged PLR status bits allows the PLR status bits to be updated without invalidating the ECC and results in protecting the data.

Figure 1:
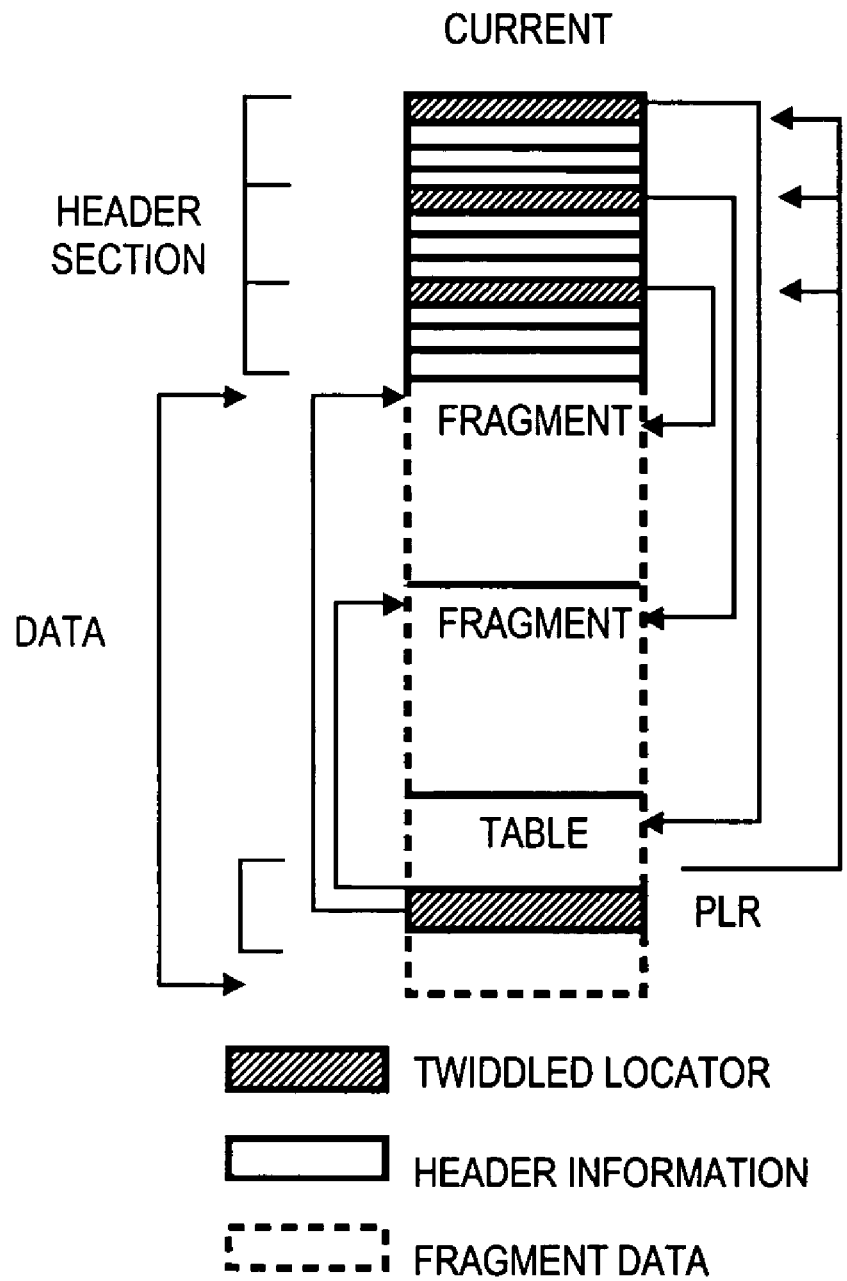
Figure 3:
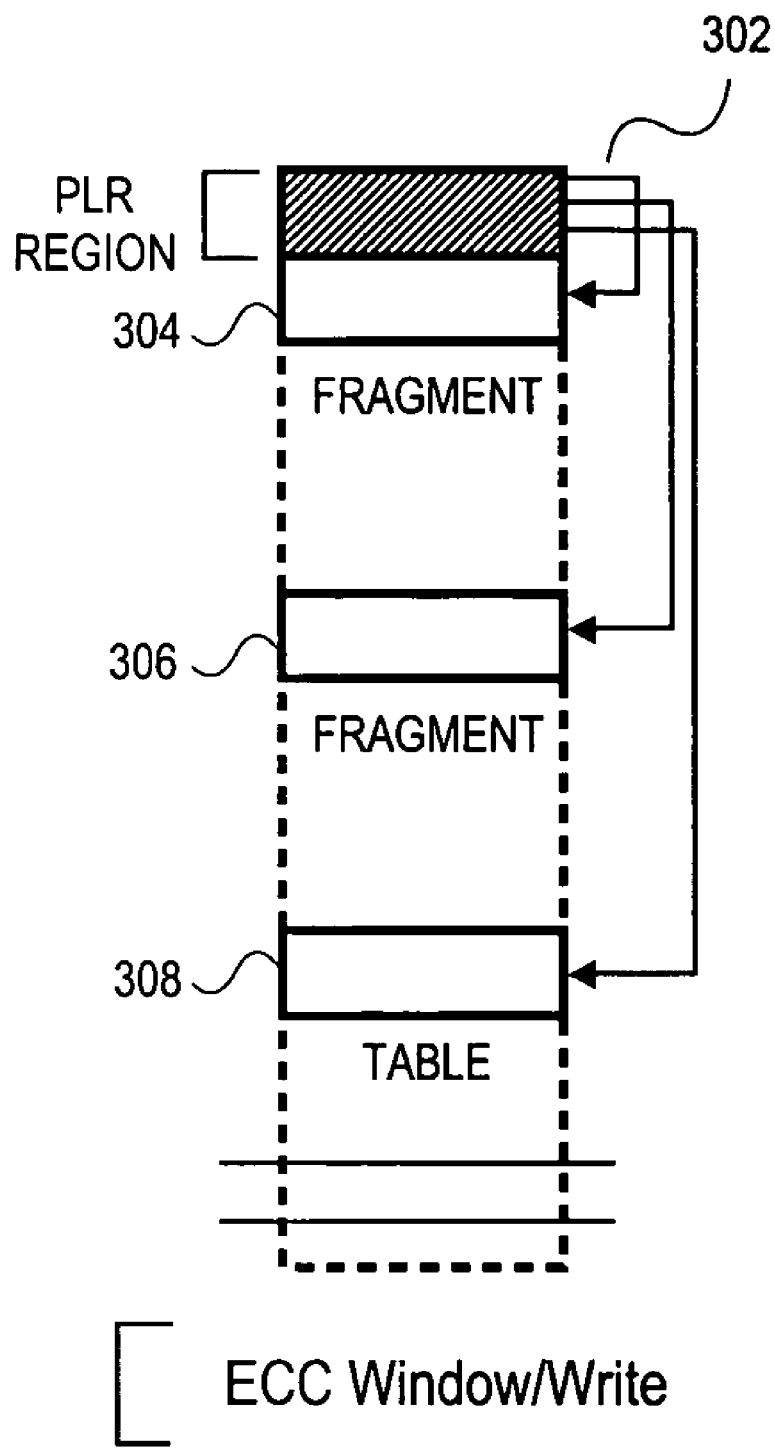
FIG. 3 shows a format of bits in accordance with one embodiment.

FIG. 3 shows a format of bits in accordance with one embodiment. As previously described, a flash media management software divides a flash memory block into individual data units or sectors, wherein each sector has an associated header for identifying a sector's status. Likewise, status bits or paired bits in Multi-Level Cell (MLC) flash are utilized for tracking the current state of each sector. In contrast to the prior art, the claimed subject matter as depicted in FIG. 3, depicts a novel technique for rearranging the PLR status bits such that all the status bits are extracted from the header and data area and united (coalesced) into a predetermined region. For example, the PLR coalesced region 302 contains all the PLR status bits and is associated with individual headers 304, 306, and 308. Each header 304, 306, and 308 are associated for one of the fragment data sections. The PLR status bits do not need the ECC protection, which will be discussed further in connection with FIG. 4. Thus, this rearranged PLR status bits allows the PLR status bits to be updated without invalidating the ECC and results in protecting the data. In contrast, the prior art did not offer the ECC protection to the data because of the issue with PLR status tracking bit updates that was previously described.

The fragment data units will receive full ECC protection because they are written to in a single time In one embodiment, the apparatus of FIG. 3 is incorporated within an ECC enabled flash memory device. Also, in another embodiment, the apparatus is supervised by flash media management software to support and partition the ECC enabled flash memory devices.

Figure 4:
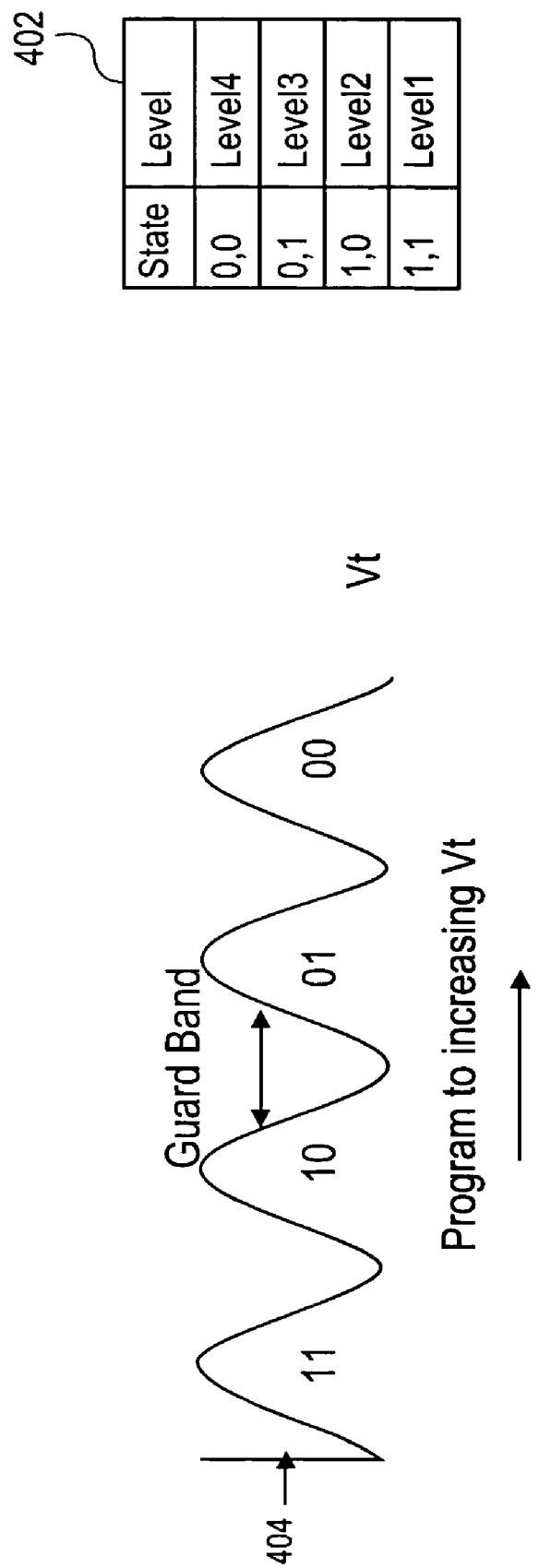
FIG. 4 shows a table for status bits in accordance with one embodiment.

FIG. 4 shows a table for status bits in accordance with one embodiment. In one embodiment, the claimed subject matter of FIG. 4 depicts multi level states 402 in a MLC flash that are utilized for PLR status bits. For example, in this embodiment, the ECC scheme is designed to protect against bit errors in the intermediate MLC states, such as, Levels 2(1,0) and Level 3(0,1). As depicted in 404, the Levels 2 and 3 are in the middle of the Vt graph. In contrast, the Levels 1(1,1) and 4 (0,0) are at opposite ends of the Vt graph and have the biggest difference in Vt, wherein Vt is a voltage threshold between levels. Therefore, for one embodiment, the PLR status tracking bits deploy Levels 1 and Level 4 states. Furthermore, levels 1 and 4 are the lowest Vt level and highest Vt level for this embodiment.

Figure 5:
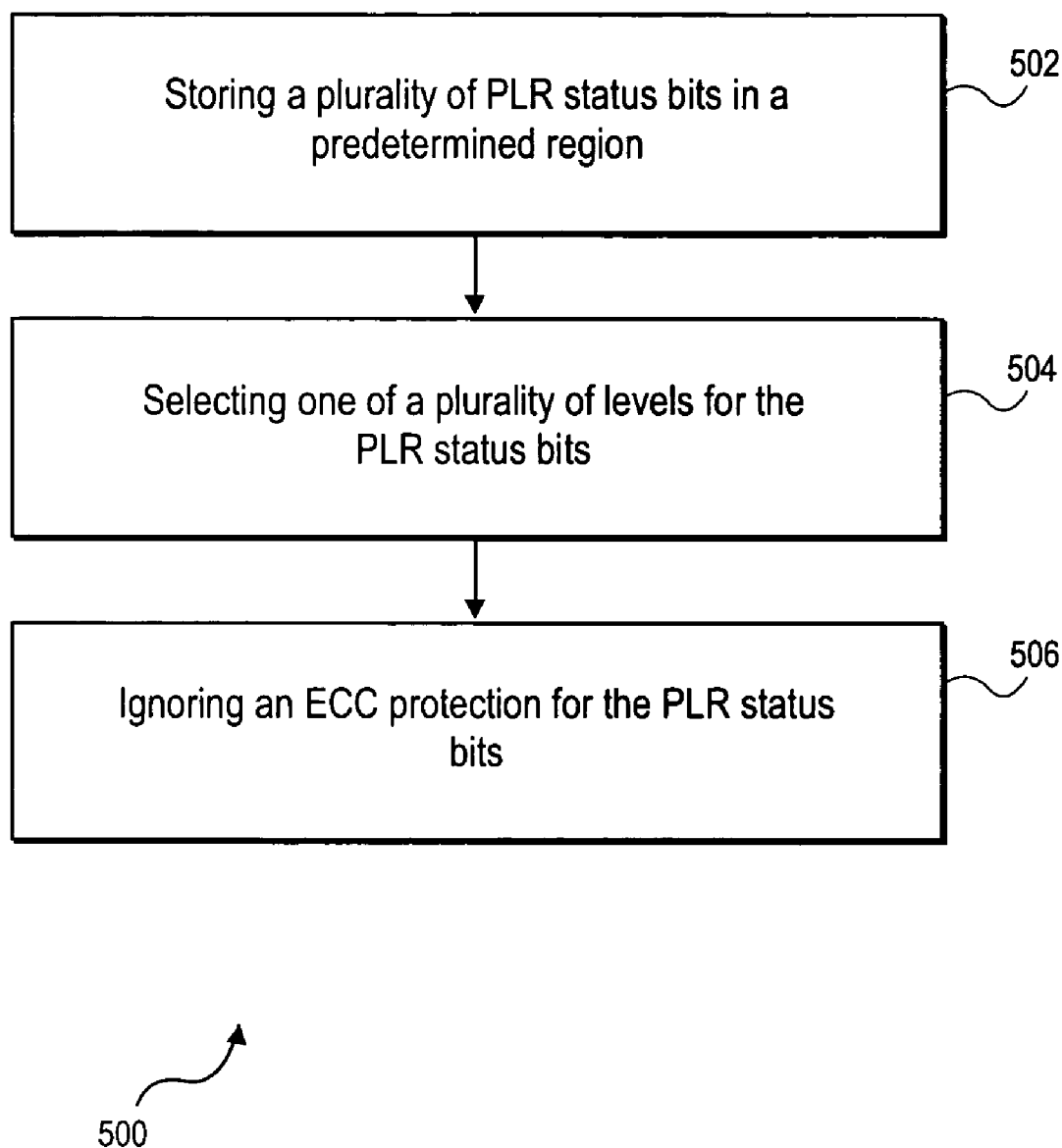
FIG. 5 shows a flowchart of a method in accordance with one embodiment.

FIG. 5 depicts a flowchart for a method in accordance with one embodiment. For example, the flowchart depicts a novel method for coalescing PLR status bits, into a predetermined region, as depicted in a block 502. Likewise, each PLR status bit may be programmed to have one of a plurality of MLC levels, as depicted in a block 504. In one embodiment, each PLR status bit may have either the highest Vt level or the lowest Vt level. Consequently, in one embodiment, the claimed subject matter allows for ignoring the ECC scheme for the PLR status bits because it was designed to protect for bit errors for intermediate Vt levels.

In one embodiment, the flowchart is implemented in a flash media management software to support and partition the ECC enabled flash memory devices.

Figure 6:
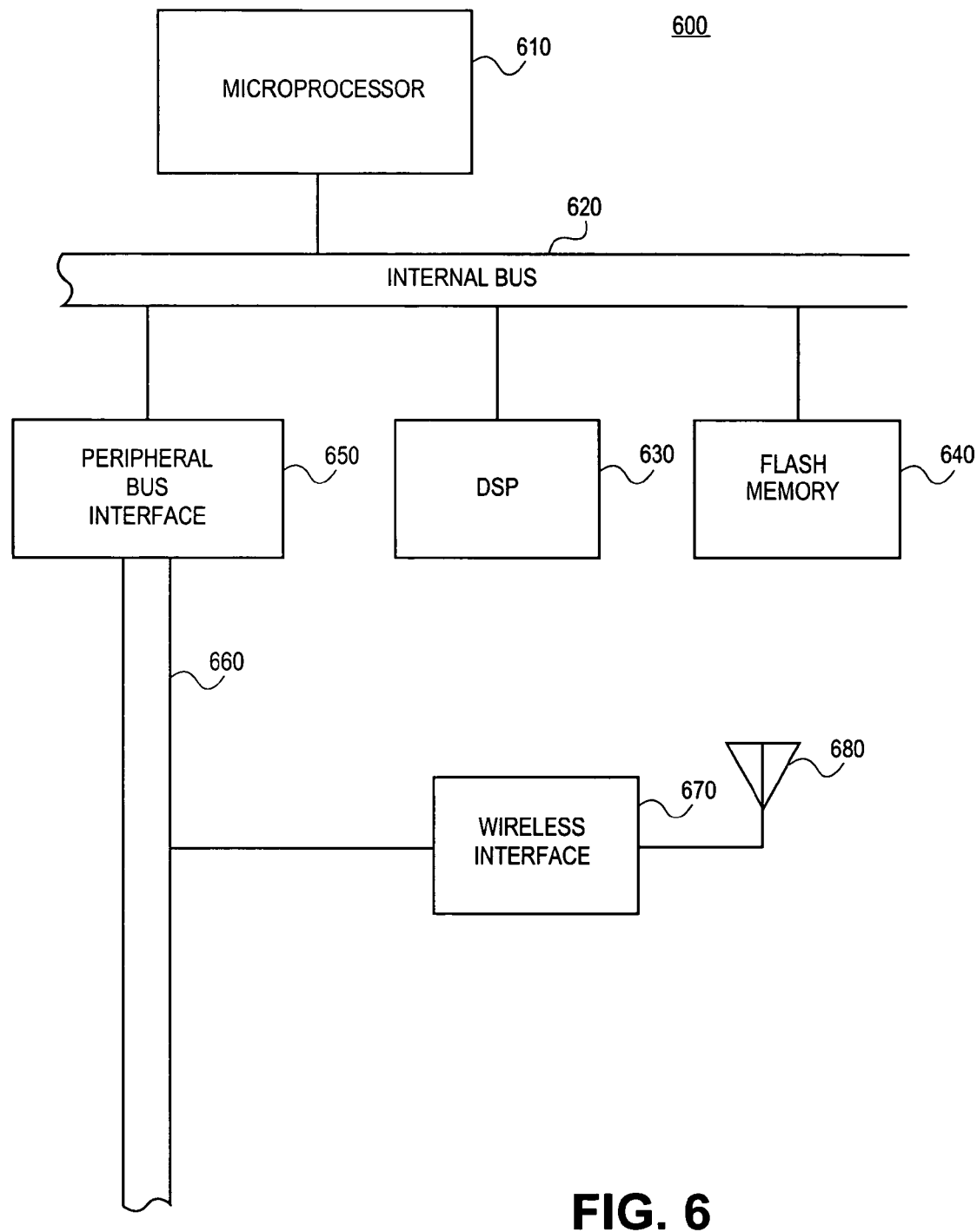
FIG. 6 shows a system in accordance with one embodiment.

FIG. 6 shows a system in accordance with one embodiment. In one embodiment, the system 600 has a wireless interface. The system comprises a microprocessor 610 coupled to an internal bus 620. Likewise, the system comprises a peripheral bus interface 550, a digital signal processor (dsp) 630, and a flash memory 640 coupled to the internal bus 620. Finally, a wireless interface 670 is coupled an antenna 680 and the bus interface 650. The wireless interface receives and transmits data and information. Also, the microprocessor and dsp perform calculations and operations involving searches of the flash memory via the internal bus 620.

In one embodiment, the system incorporates the method and apparatus depicted earlier in connection with FIGS. 3–5.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is contemplated, therefore, that such modifications can be made without departing from the spirit or scope of the present invention as defined in the appended claims.

The invention claimed is:

1. An article of manufacture comprising:
a machine-readable medium having a plurality of machine readable instructions, wherein when the instructions are executed by a processor, the instructions provide to manage a system for:
dividing a flash memory block into individual data areas or sectors, wherein each sector has an associated header for identifying a sector's status; and
rearranging a plurality of Power Loss Recovery (PLR) status bits such that all the PLR status bits are extracted from a header and data area and coalesced into a predetermined region.

2. The article of manufacture of claim 1 wherein the system is a flash media.

3. The article of manufacture of claim 2 wherein the flash media comprises a flash memory to support error correcting code (ECC).

4. The article of manufacture of claim 3 wherein the flash memory supports multilevel states.

5. The article of manufacture of claim 1 wherein the predetermined region does not have ECC protection and relies on level 1 and level 4 states.

6. A method for organizing PLR status bits comprising;
storing a plurality of PLR status bits in a predetermined region within a flash memory; and
selecting a multi-level state for the plurality of PLR status bits, wherein selecting one of a plurality of multi-state levels comprises selecting either a level 1 or level 4 states for the plurality of PLR status bits.

7. A method for organizing PLR status bits comprising;
storing a plurality of PLR status bits in a predetermined region within a flash memory; selecting a multi-level state for the plurality of PLR status bits, wherein selecting one of a plurality of multi-state levels comprises selecting either a level 1 or level 4 states for the plurality of PLR status bits; and
protecting the flash memory with ECC except for the PLR status bits.

8. An article of manufacture comprising:
a machine-readable medium having a plurality of machine readable instructions, wherein when the instructions are executed by a processor, the instructions provide to manage a system for:
rearranging a plurality of Power Loss Recovery (PLR) status bits such that all the PLR status bits are extracted from a header and data area and coalesced into a predetermined region;
selecting a multi-level state for the plurality of PLR status bits; and
protecting a flash memory with ECC except for the PLR status bits.

9. The article of manufacture of claim 8 wherein the system is a flash media.

10. The article of manufacture of claim 9 wherein the flash media comprises a flash memory to support error correcting code (ECC).

11. The article of manufacture of claim 8 wherein the predetermined region does not have ECC protection and relies on level 1 and level 4 states.

12. A flash memory to support ECC comprising:
a flash memory block divided into individual data areas and sectors, wherein each sector has an associated header for identifying a sector's status; and
a plurality of Power Loss Recovery (PLR) status bits such that all the PLR status bits are extracted from a header and data area and coalesced into a predetermined region;
the FCC to detect and correct errors for a flash memory block except for the PLR status bits.

13. The apparatus of claim 12 wherein the flash memory supports multi-level states.

14. The apparatus of claim 13 wherein PLR status bits are Level 1 or Level 4 states.

15. A system comprising:
a first logic to request data from a flash memory, wherein the flash memory comprises:
individual data areas and sectors, wherein each sector has an associated header For identifying a sector's status;
a plurality of Power Loss Recovery (PLR) status bits such that all the PLR status bits are extracted from a header and data area and coalesced into a predetermined region; and
the ECC to detect and correct errors for a flash memory block except for the PLR status bits.

16. The system of claim 15 further comprising a wireless interface.

17. The system of claim 15 wherein the flash memory supports multi-level states.

18. The system of claim 15 wherein PLR status bits are Level 1 or Level 4 states.

19. The system of claim 15 wherein the first logic is a microprocessor.

20. The system of claim 15 further comprising a second logic to request data from the flash memory, the second logic is a digital signal processor.

* * * * *

UNITED STATES PATENT AND TRADEMARK OFFICE
CERTIFICATE OF CORRECTION

PATENT NO. : 7,181,672 B2
APPLICATION NO. : 10/672998
DATED : February 20, 2007
INVENTOR(S) : Sunil R. Atri and John C. Rudelic It is certified that error appears in the above-identified patent and that said Letters Patent is hereby corrected as shown below:

<u>Column 4</u>:
Line 46, "FCC" should be --ECC--.

Signed and Sealed this

Fourteenth Day of August, 2007

JON W. DUDAS
*Director of the United States Patent and Trademark Office*